United States Patent
Bae et al.

(10) Patent No.: US 9,361,661 B2
(45) Date of Patent: Jun. 7, 2016

(54) DISPLAY DRIVER INTEGRATED CIRCUIT AND DISPLAY DATA PROCESSING METHOD THEREOF

(71) Applicant: SAMSUNG ELECTRONICS CO., LTD., Suwon-si, Gyeonggi-do (KR)

(72) Inventors: Jong-Kon Bae, Seoul (KR); Dokyung Kim, Yongin-si (KR); Wonsik Kang, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 310 days.

(21) Appl. No.: 14/017,422

(22) Filed: Sep. 4, 2013

(65) Prior Publication Data
US 2014/0063033 A1 Mar. 6, 2014

(30) Foreign Application Priority Data
Sep. 6, 2012 (KR) .................. 10-2012-0098900

(51) Int. Cl.
*G06T 1/60* (2006.01)
*G09G 5/00* (2006.01)
*G09G 5/399* (2006.01)

(52) U.S. Cl.
CPC ...... *G06T 1/60* (2013.01); *G09G 5/006* (2013.01); *G09G 5/399* (2013.01); *G09G 2370/10* (2013.01)

(58) Field of Classification Search
CPC ..... G09G 5/00; G09G 5/006; G09G 2370/10; G09G 5/399; G06T 1/60

USPC .......................... 345/519, 204, 545
See application file for complete search history.

(56) References Cited

U.S. PATENT DOCUMENTS

| 6,448,976 | B1* | 9/2002 | Nitta .................. | G09G 3/3685 345/698 |
| 6,867,759 | B1* | 3/2005 | Baek .................. | G09G 3/3611 345/98 |
| 7,142,055 | B2 | 11/2006 | Inokuchi | |

(Continued)

FOREIGN PATENT DOCUMENTS

| JP | 2006-330582 | 12/2006 |
| KR | 1020060096739 A | 9/2006 |

(Continued)

*Primary Examiner* — Phi Hoang
*Assistant Examiner* — Michael Le
(74) *Attorney, Agent, or Firm* — F. Chau & Associates, LLC (57) ABSTRACT

A display driver integrated circuit is provided which includes a first line buffer which receives first pixel data of an odd lane in response to an external clock and outputs the first pixel data in response to an internal clock; a second line buffer which receives second pixel data of an even lane in response to the external clock and outputs the second pixel data in response to the internal clock; a line buffer controller which receives display data by the two pixel data to output the first and second pixel data; a data merger which merges the first pixel data output from the first line buffer and second pixel data output from the second line buffer; and an image data processing block which processes the merged pixel data, wherein a frequency of the internal clock is lower than a frequency of the external clock.

18 Claims, 11 Drawing Sheets

(56) References Cited

U.S. PATENT DOCUMENTS

| | | |
|---|---|---|
| 7,826,264 B2 | 11/2010 | Kawase et al. |
| 7,916,133 B2 | 3/2011 | Inokuchi |
| 8,102,352 B2 | 1/2012 | Lee |
| 2009/0207159 A1 | 8/2009 | Govil |
| 2009/0309889 A1* | 12/2009 | Bae ................. G09G 5/363 345/531 |
| 2011/0001768 A1* | 1/2011 | Lin .................. G09G 3/3685 345/698 |
| 2011/0156936 A1* | 6/2011 | Kim ................. H04L 25/14 341/100 |
| 2011/0248984 A1 | 10/2011 | Tyrrell et al. |
| 2014/0006836 A1* | 1/2014 | Menon ............... G06F 1/12 713/400 |

FOREIGN PATENT DOCUMENTS

| | | |
|---|---|---|
| KR | 1020060131088 A | 12/2006 |
| KR | 1020070000120 A | 1/2007 |
| KR | 1020100036597 A | 4/2010 |
| KR | 20100124263 | 11/2010 |
| KR | 1020101012463 A | 11/2010 |

* cited by examiner

DISPLAY DRIVER INTEGRATED CIRCUIT AND DISPLAY DATA PROCESSING METHOD THEREOF

CROSS-REFERENCE TO RELATED APPLICATIONS

The application claims priority under 35 U.S.C. §119 to Korean Patent Application No. 10-2012-0098900 filed on Sep. 6, 2012, in the Korean Intellectual Property Office, the disclosure of which is incorporated by reference in its entirety herein.

BACKGROUND

1. Technical Field

Exemplary embodiments of the inventive concept relate to a display driver integrated circuit and a display data processing method thereof.

2. Discussion of Related Art

Some smart phones have a display capable of displaying high-definition television (HDTV) signals. The smart phone may include a display driver integrated circuit (DDI) for managing output of these signals to the display. For example, the display may be an organic light emitting display (OLED). However, excessive current may be consumed and excessive heat may be produced when the DDI is used for driving an ultra-high-definition mobile display.

SUMMARY

According to an exemplary embodiment of the inventive concept, a display driver integrated circuit includes a first line buffer which receives first pixel data of an odd lane in response to an external clock signal and outputs the first pixel data in response to an internal clock signal; a second line buffer which receives second pixel data of an even lane in response to the external clock signal and outputs the second pixel data in response to the internal clock signal; a line buffer controller which receives display data by the two pixel data to output the first and second pixel data; a data merger which merges the first pixel data output from the first line buffer and second pixel data output from the second line buffer; and an image data processing block which processes the merged pixel data. A frequency of the internal clock signal is lower than a frequency of the external clock signal.

In an exemplary embodiment, each of the first and second pixel data is 2-pixel data.

In an exemplary embodiment, the line buffer controller controls a write operation and a read operation of the first and second line buffers and uses the external clock signal as a write clock for the write operation and the internal clock signal as a read clock for the read operation.

In an exemplary embodiment, the line buffer controller outputs a read data signal for merging the first pixel data output from the first line buffer and the second pixel data output from the second line buffer.

In an exemplary embodiment, the image data processing block processes the merged pixel data which includes four pixel data.

In an exemplary embodiment, the display driver integrated circuit further includes a shift register which shifts display data, processed by the data image processing block, by the four pixel data in response to a clock signal; a latch circuit which stores the shifted display data; and a source driver which generates an analog voltage corresponding to display data stored at the latch circuit.

In an exemplary embodiment, the image data processing block processes the merged pixel data, which includes the two pixel data.

In an exemplary embodiment, the display driver integrated circuit further includes a pixel converter which converts two-pixel display data processed by the image data processing block into four-pixel display data.

In an exemplary embodiment, the external clock signal and a data packet are received from an external device in an MIPI (mobile industry processor interface) format.

In an exemplary embodiment, the display driver integrated circuit further includes a MIPI client which receives the data packet via a plurality of lanes; and an MIPI wrapper which receives 32-bit display data from the MIPI client in response to the external clock and outputs 48-bit display data by the two pixel data in response to the external clock signal.

In an exemplary embodiment, the plurality of lanes is 4 and a frequency of the external clock is below 125 MHz.

In an exemplary embodiment, the display driver integrated circuit further includes an oscillator which generates the internal clock.

According to an exemplary embodiment of the inventive concept, a display data processing method of a display driver integrated circuit includes: writing display data to at least one line buffer in response to an external clock signal; reading the display data from the at least one line buffer in response to an internal clock signal; and processing the read display data by a predetermined pixel data unit. A frequency of the internal clock signal is lower than a frequency of the external clock.

In an exemplary embodiment, the display data processing method further includes receiving a data packet and the external clock signal from an external device; and outputting the display data from the input data packet to the at least one line buffer, where the output display data is pixel data for four pixels.

In an exemplary embodiment, the display data processing method further includes merging the read display data by the predetermined pixel data unit.

According to an exemplary embodiment of the inventive concept, a display driver integrated circuit (DDI) includes a clock divider, a first-in-first-out FIFO memory, and an image data processing block. The clock divider receives an input of image data and outputs divided image data in response to an external clock signal. The FIFO memory receives the divided image data and outputs the divided image data in response to an internal clock signal. The image data processing block is configured to process the divided image data output by the FIFO memory. A frequency of the internal clock signal is lower than a frequency of the external clock signal.

In an exemplary embodiment, the divided image data input to the image data processing block is four pixel data representing image data for four pixels. The DDI may further include a shift register, a latch circuit, and a source driver. In an exemplary embodiment, the shift register shifts display data output by the processing block by the four pixel data in response to a clock signal, the latch circuit stores the shifted display data, and the source driver generates an analog voltage corresponding to display data stored in the latch circuit.

In an exemplary embodiment, the divided image data input to the image data processing block is two pixel data representing image data for two pixels. In an exemplary embodiment, the DDI further includes a pixel converter to convert two pixel data processed by the image data processing block into four pixel data.

BRIEF DESCRIPTION OF THE FIGURES

Exemplary embodiments of the inventive concept will become apparent from the following description with reference to the following figures, wherein like reference numerals refer to like parts throughout the various figures unless otherwise specified, and wherein.

DETAILED DESCRIPTION

Hereinafter, exemplary embodiments of the inventive concept will be described in detail with reference to the accompanying drawings. The inventive concept may, however, be embodied in various different forms, and should not be construed as being limited to the embodiments set forth therein. Throughout the drawings and specification, like reference numerals may refer to like elements.

Figure 1:
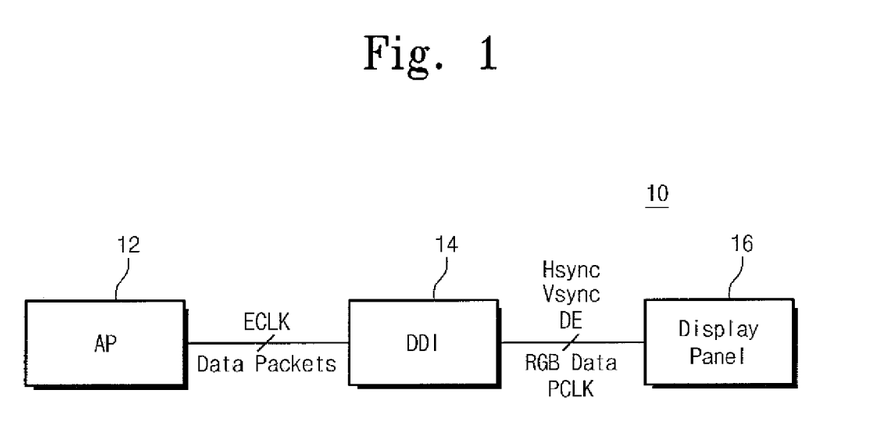
FIG. 1 is a block diagram illustrating a display system according to an exemplary embodiment of the inventive concept.

FIG. 1 is a block diagram illustrating a display system according to an exemplary embodiment of the inventive concept. Referring to FIG. 1, a display system 10 includes an application processor (hereinafter, referred to as AP) 12, a display driver integrated circuit (hereinafter, referred to as DDI) 14, and a display panel 16. In an exemplary embodiment, the AP 12 is a system on a chip (SoC) or mobile application processor designed to support applications running in a mobile operating system environment.

In an exemplary embodiment, the AP 12 controls an overall operation of the display system 10, and receives and outputs data packets having display data in response to a clock signal ECLK. In an exemplary embodiment, the data packet includes display data, and at least one of a horizontal synchronization signal Hsync, a vertical synchronization signal Vsync, and a data enable signal DE.

The DDI 14 receives data packets from the AP 12 to output the horizontal synchronization signal Hsync, the vertical synchronization signal Vsync, the data enable signal DE, and display data to the display panel 16. In an exemplary embodiment, the AP 12 and the DDI 14 provide an interface such as MIPI (mobile industry processor interface), a MDDI (mobile display digital interface), CDP (compact display port), or the like. Below, it is assumed that the DDI 14 interfaces according to an MIPI format for convenience of discussion.

In an exemplary embodiment, the DDI 14 includes a graphic memory GRAM for a high speed serial interface. Without the GRAM, the DDI 14 may consume more power (e.g., current) and produce more heat. Further, the load on the AP 12 may be reduced when the GRAM is included within the DDI 14. Display data input from the AP 12 may be written into the GRAM and data stored within the GRAM may be output via a scan operation. In an exemplary embodiment, the GRAM is a dual port DRAM.

The DDI 14 may buffer data packets without using the GRAM for the high speed serial interface with the AP 12 and output display data. Below, it is assumed that the DDI 14 does not use the GRAM.

In an exemplary embodiment, the display panel 16 displays the display data in units of frames according to a control of the DDI 14. The display panel 16 may be one of an organic light emitting display panel (OLED), a liquid crystal display panel (LCD), a plasma display panel (PDP), an electrophoretic display panel, and an electrowetting display panel. However, the inventive concept is not limited thereto, as display types may be used.

The display system 10 may be suitable for a high speed interface via the DDI 14 configured to buffer display data.

Figure 2:
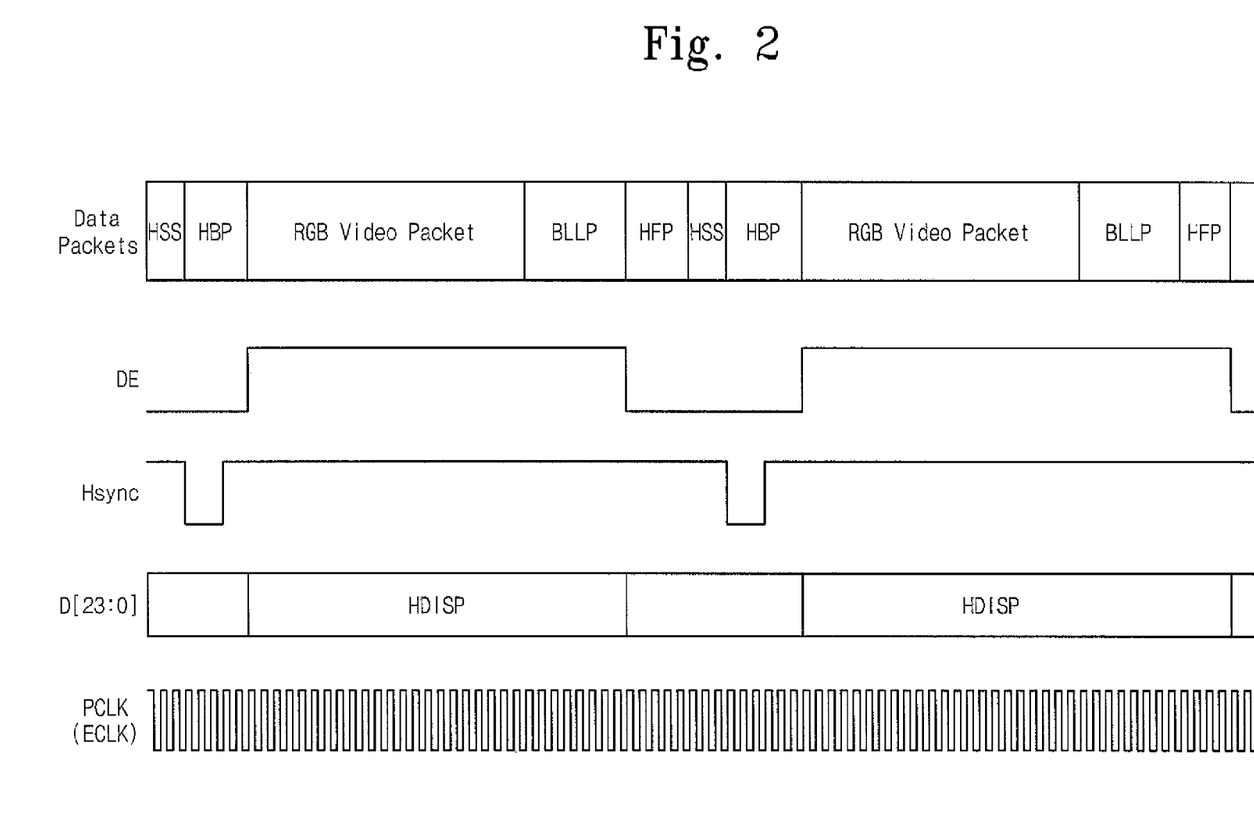
FIG. 2 is a diagram illustrating a data packet according to an exemplary embodiment of the inventive concept.

FIG. 2 is a diagram of a data packet according to an exemplary embodiment of the inventive concept. In FIG. 2, a data packet may be data to be displayed on a display panel 16 in a horizontal direction. The data packet may include an Hsync Start (HSS), a horizontal Blanking Packet of LPDT for Back porch (HBP), an RGB video packet, a Blanking Packet or LPDT mode (BLLP), and a Horizontal Blanking Packet or LPFT for Front porch (HFP). However, the inventive concept is not limited thereto.

A DDI 14 may receive a data packet to be displayed in a horizontal direction to output a data enable signal DE, a horizontal synchronization signal Hsync, RGB data D[23:0], and a clock signal PCLK. Herein, the clock signal PCLK may be a clock signal ECLK input from an AP 12.

In FIG. 2, there is illustrated a data packet to be displayed in a horizontal direction. A data packet to be displayed in a vertical direction may be similar to the data packet display in the horizontal direction.

Figure 3:
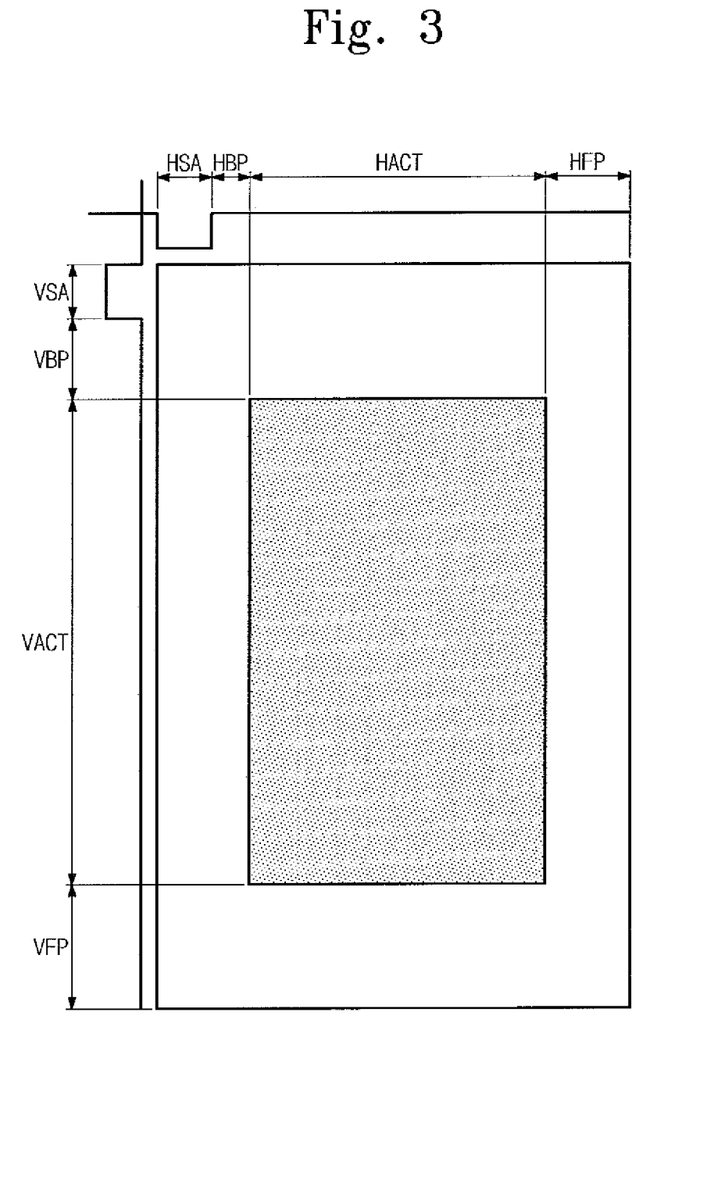
FIG. 3 is a diagram illustrating display timing according to an exemplary embodiment of the inventive concept.

FIG. 3 is a diagram illustrating display timing according to an exemplary embodiment of the inventive concept. The timing may be with respect to a frame of data displayed at FIG. 2.

Horizontal speed action (HSA), horizontal back porch (HBP), horizontal active (HACT), and horizontal front porch (HFP) may be included on the basis of a horizontal synchronization signal Hsync in a horizontal direction.

Vertical speed action (VSA), vertical back porch (VBP), vertical active (VACT), and vertical front porch (VFP) may be included on the basis of a vertical synchronization signal Vsync in a vertical direction.

The above-described timing parameters may be determined variously according to a resolution of a display panel 16.

For ease of description, it is assumed that data packets are transferred between an AP 12 and a DDI 14 according to an MIPI format.

Figure 4:
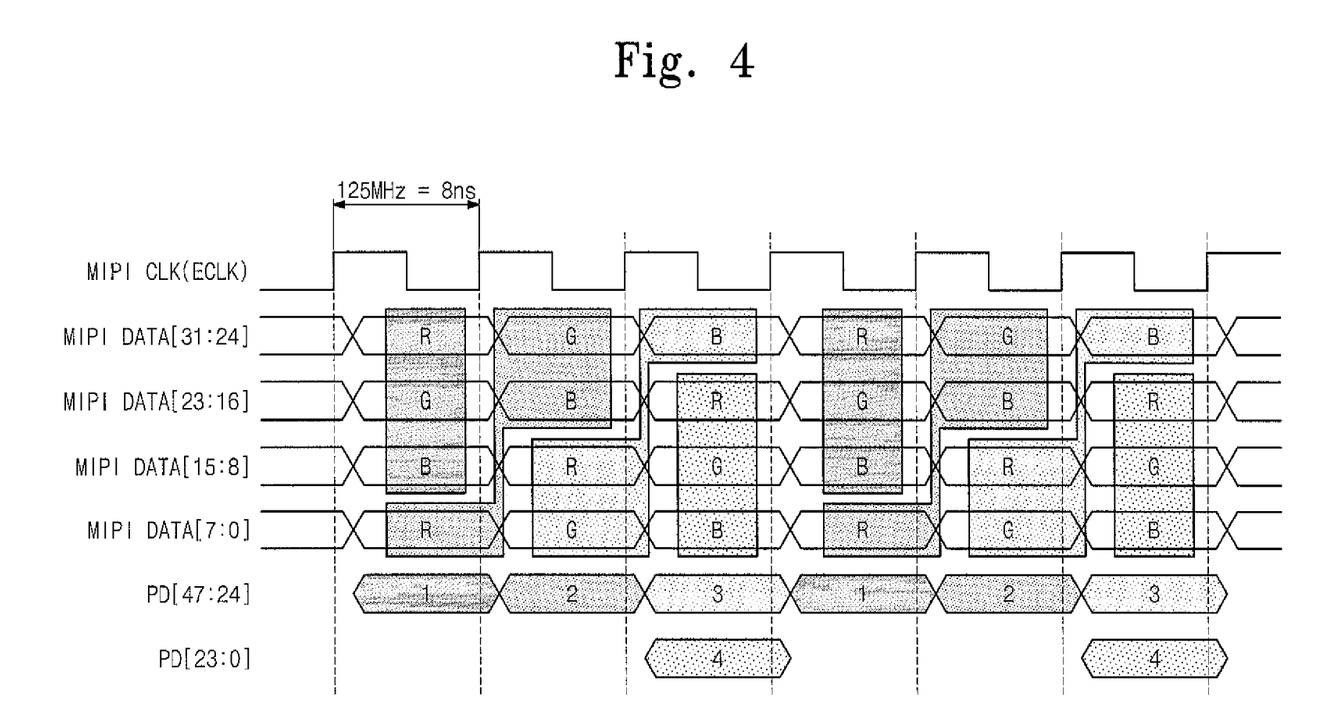
FIG. 4 is a diagram illustrating an input of MIPI data according to an exemplary embodiment of the inventive concept.

FIG. 4 is a diagram illustrating an input of MIPI data according to an exemplary embodiment of the inventive concept. Referring to FIG. 4, there is illustrated an example in which display data is input according to the 4-lane MIPI. With the 4-lane MIPI, data packets MIPI DATA[7:0], MIPI DATA [15:8], MIPI DATA[23:16], and MIPI DATA[31:24] are transferred to the DDI 14 from the AP 12 (refer to FIG. 1) at a certain frequency (e.g., 1 Gbps). For example, if data transferred at the rate of 1 Gbps is converted by the byte on the basis of the MIPI 4-lane, display data may be received using an external clock signal MIPI CLK of 125 MHz. For example, 32-bit display data may be input each period of the external clock signal MIPI CLK. Since the period of 125 MHz clock is 8 ns, 32-bit display data may be input every 8 ns. In addition, pixel data of four pixels may be received every three periods of the external clock signal MIPI CLK (e.g., ECLK in FIG. 1). For example, pixel data may be formed of one byte of red data, one byte of green data, and one byte of blue data.

For example, in FIG. 4, pixel data 1 of PD[47:24] includes dark-shaded R, G, B in the first period of MIPI CLK, pixel data 2 of PD[47:24] includes lighter-shaded R, G, B in the first and second periods of MIPI CLK, pixel data 3 of PD[47:24] includes even lighter-shaded R, G, B in the second and third periods of MIPI CLK and pixel data 4 of PD[23:0] includes least-shaded R, G, B in the third period of MIPI CLK.

The data packets of MIPI data according to an exemplary embodiment of the inventive concept are not limited to be input according to the 4-lane MIPI. The data packets of MIPI data according to an exemplary embodiment of the inventive concept may be input according to at least one lane MIPI. Also, display data may be input according to the 3-lane MIPI.

Figure 5:
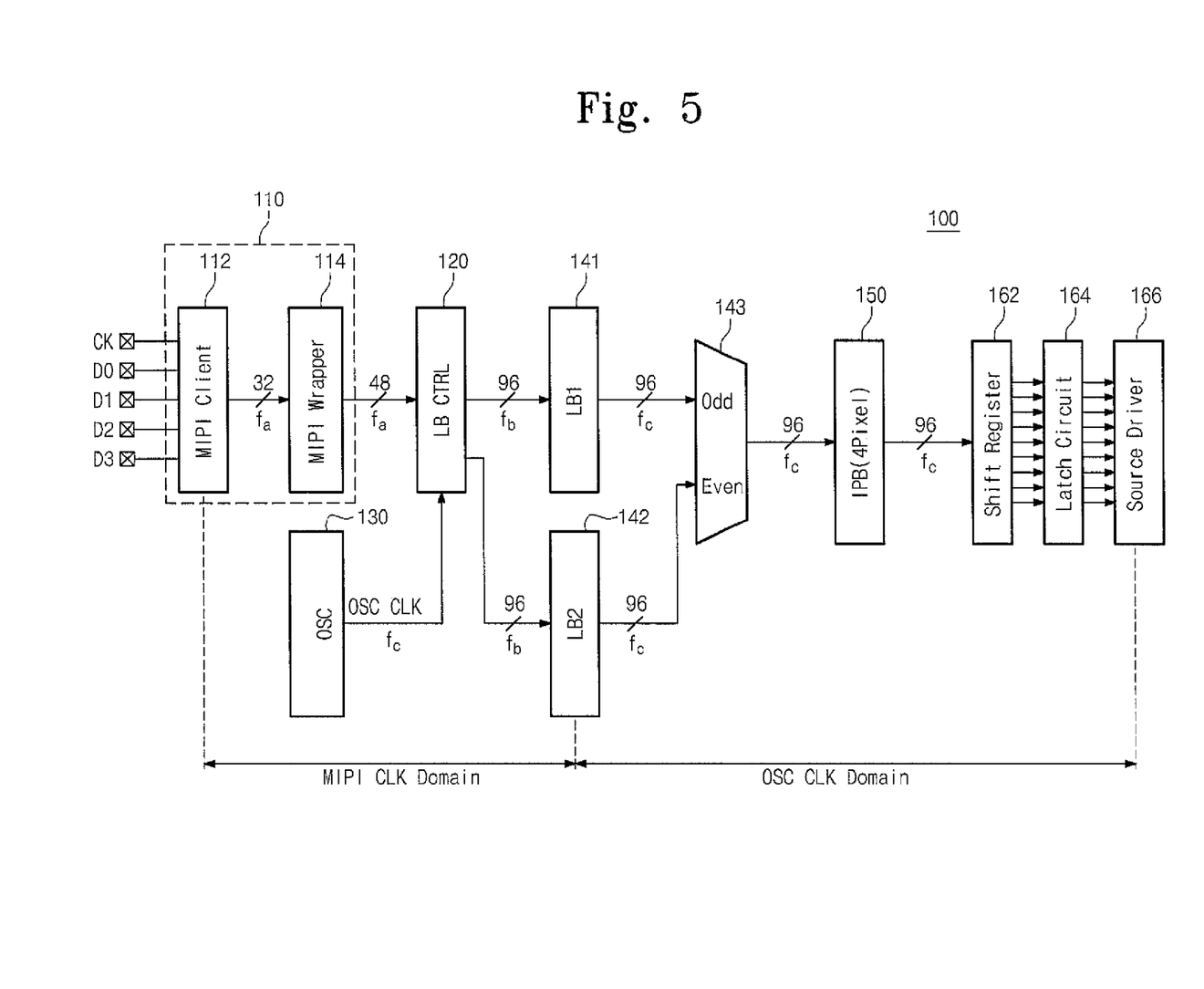
FIG. 5 is a block diagram illustrating a 4-pixel based DDI according to an exemplary embodiment of the inventive concept.

FIG. 5 is a block diagram illustrating a 4-pixel based DDI according to an exemplary embodiment of the inventive concept. Referring to FIG. 5, a DDI 100 includes a MIPI block 110, a line buffer controller 120, an oscillator 130, a first line buffer 141, a second line buffer 142, a data merger 143, an image data processing block 150, a shift register 162, a latch circuit 164, and a source driver 166. As an example, the image data processing block 150 may perform image enhancement, image correction, etc.

The MIPI block 110 may include a MIPI client 112 and an MIPI wrapper 114.

The MIPI client 112 may receive a data packet from an external host (e.g., AP 12 in FIG. 1). Herein, the data packet may include display data, a horizontal synchronization signal Hsync, a vertical synchronization signal Vsync, a data enable signal DE, and so on. For example, the MIPI client 112 may receive display data via a plurality of data pins D0 to D3 in response to an external clock signal MIPI CLK input via a clock pin CK. As illustrated in FIG. 4, four bytes, that is, 32-bit display data may be received via four lanes in response to the external clock signal MIPI CLK. In an exemplary embodiment, 1 Gbps (125 MHz/Byte) display data is transferred per lane. However, the inventive concept is not limited to any particular data transfer rate.

The MIPI client 112 may output the 32-bit display data using a frequency $f_a$ of the external clock signal MIPI CLK. In an exemplary embodiment of the inventive concept, the frequency $f_a$ of the external clock signal MIPI CLK is 125 MHz. The frequency $f_a$ may vary based on the data transfer rate being used.

In an exemplary embodiment, the MIPI wrapper 114 receives display data output from the MIPI client 112, and outputs data by the two pixels in response to the external clock signal MIPI CLK. For example, the MIPI wrapper 114 may output 48-bit display data using a frequency $f_a$ of the external clock signal MIPI CLK.

In an exemplary embodiment, the line buffer controller 120 outputs first display data, corresponding to an odd line, from among display data input from the MIPI wrapper 114 and second display data, corresponding to an even line, from among the display data input from the MIPI wrapper 114.

Each of the first and second display data may be output in units representing data for four pixels (e.g., four pixel data). For example, the line buffer controller 120 may receive display data in units representing data for two pixels (e.g., two pixel data) to output display data in units of four pixel data. For example, the line buffer controller 120 may output 96-bit display data using a frequency $f_b$ corresponding to half a frequency $f_a$ of the external clock signal MIPI CLK. In an exemplary embodiment, the frequency $f_b$ is 62.5 MHz.

The oscillator 130 generates an internal clock signal OSC CLK which is used in the DDI 100. In an exemplary embodiment, a frequency $f_c$ of the internal clock signal OSC CLK is 35.97 MHz. However, the frequency $f_c$ of the internal clock signal OSC CLK is not limited to any particular frequency.

The first line buffer 141 stores the first display data from the line buffer controller 120. The first line buffer 141 may perform a read operation in response to the internal clock signal OSC CLK. For example, the first line buffer 141 may perform a read operation using a frequency $f_c$ of the internal clock signal OSC CLK to output a result.

The second line buffer 142 stores the second display data from the line buffer controller 120. The second line buffer 142 may perform a read operation in response to the internal clock signal OSC CLK. For example, the second line buffer 142 may perform a read operation using a frequency $f_c$ of the internal clock signal OSC CLK to output a result.

With a write speed of at least one embodiment of the inventive concept, display data input in units of two pixel data may be stored in the line buffers 141 and 142 in units of four pixel data. Thus, it may be possible to improve the speed of data transfers or obtain a ⅓ speed-down effect.

The data merger 143 merges data read from the first and second line buffers 141 and 142 to output display data in units of four pixel data. For example, the data merger 143 outputs display data in units of four pixel data using a frequency $f_c$ of the internal clock signal OSC CLK.

The image data processing block 150 processes display data output from the data merger 143 in units of four pixel data. In an exemplary embodiment, the image data processing block 150 operates below 70 MHz. For example, the image data processing block 150 may output four pixel display data processed using a frequency fc of the internal clock signal OSC CLK.

The shift register 162 shifts display data in units of four pixel data. In an exemplary embodiment, the shift register 162 operates below 42 MHz.

The latch circuit 164 stores the shifted display data.

The source driver 166 processes display data stored by the latch circuit 164 by the N pixel data. For example, the source driver 166 may output analog voltages corresponding to display data.

The DDI 100 according to an exemplary embodiment of the inventive concept processes display data at a high speed with low power by buffering the display data at the line buffers 141 and 142 in response to the internal clock signal OSC CLK.

Figure 6:
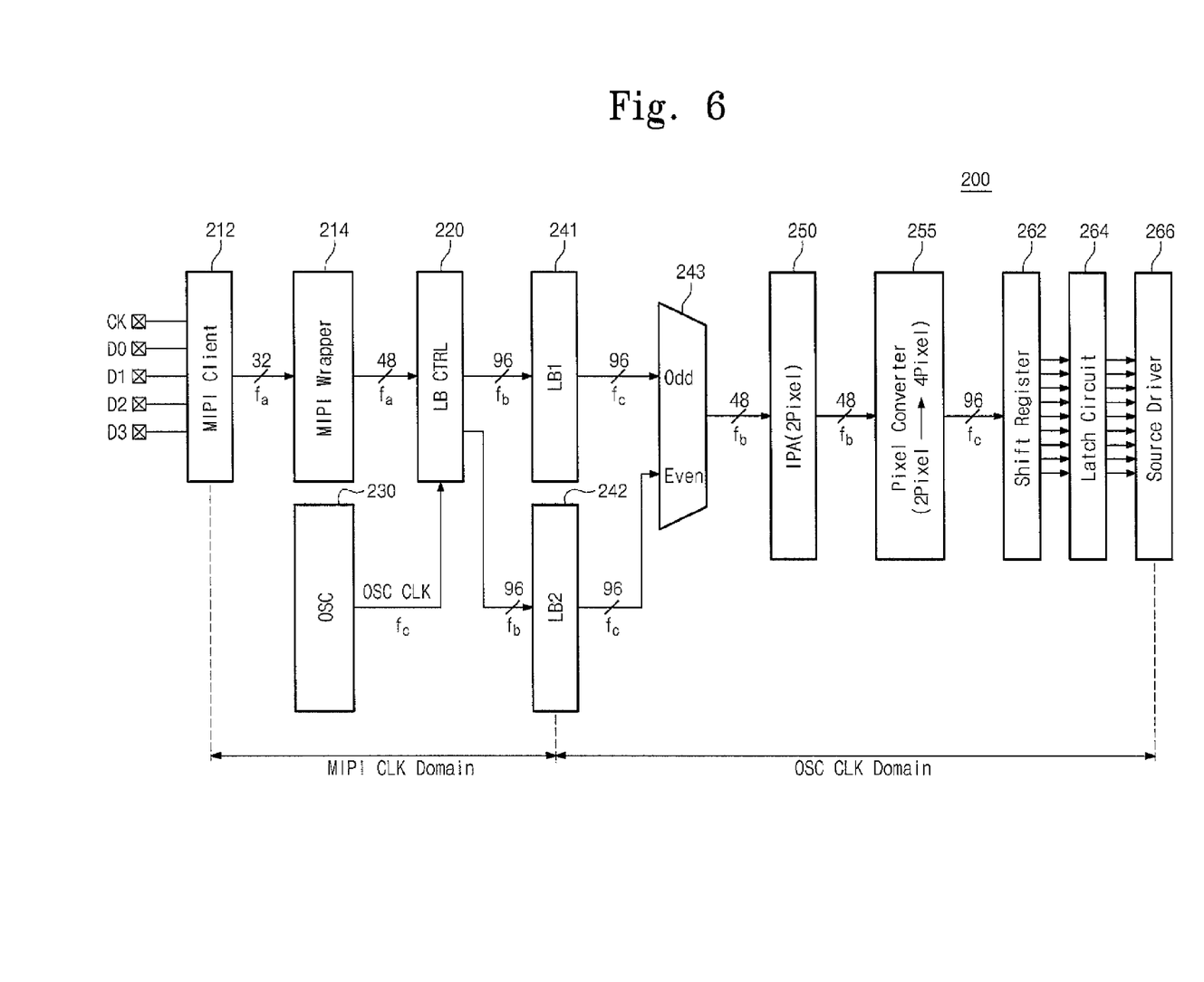
FIG. 6 is a block diagram illustrating a 2-pixel based DDI according to an exemplary embodiment of the inventive concept.

FIG. 6 is a block diagram illustrating a 2-pixel based DDI according to an exemplary embodiment of the inventive concept. Referring to FIG. 6, a DDI 200 includes a MIPI client 212, a MIPI wrapper 214, a line buffer controller 220, an oscillator 230, a first line buffer 241, a second line buffer 242, a data merger 243, an image data processing block 250, a shift register 262, a latch circuit 264, and a source driver 266.

In FIG. 6, the MIPI client 212, the MIPI wrapper 214, the line buffer controller 220, the oscillator 230, the first line buffer 241, the second line buffer 242, the shift register 262, the latch circuit 264, and the source driver 266 may be configured the same as a MIPI client 112, a MIPI wrapper 114, a line buffer controller 120, an oscillator 130, a first line buffer 141, a second line buffer 142, a shift register 162, a latch circuit 164, and a source driver 166 in FIG. 4, and a description thereof is thus omitted.

The data merger 243 merges data read from the first and second line buffers 241 and 242 to output display data in units of two pixel data. For example, the data merger 243 may output display data in units of two pixel data using a frequency $f_b$.

The image data processing block 250 processes display data output from the data merger 243 in units of two pixel data. In an exemplary embodiment, the image data processing block 250 processes and outputs two pixel display data processed using the frequency $f_b$.

A pixel converter 255 receives display data processed by the image data processing block 250 in units of two pixel data to output the display data in units of four pixel data. For example, the pixel converter 255 may receive 48-bit display data using the frequency $f_b$ to output 96-bit display data using a frequency $f_c$ of an internal clock signal OSC CLK.

Figure 7:
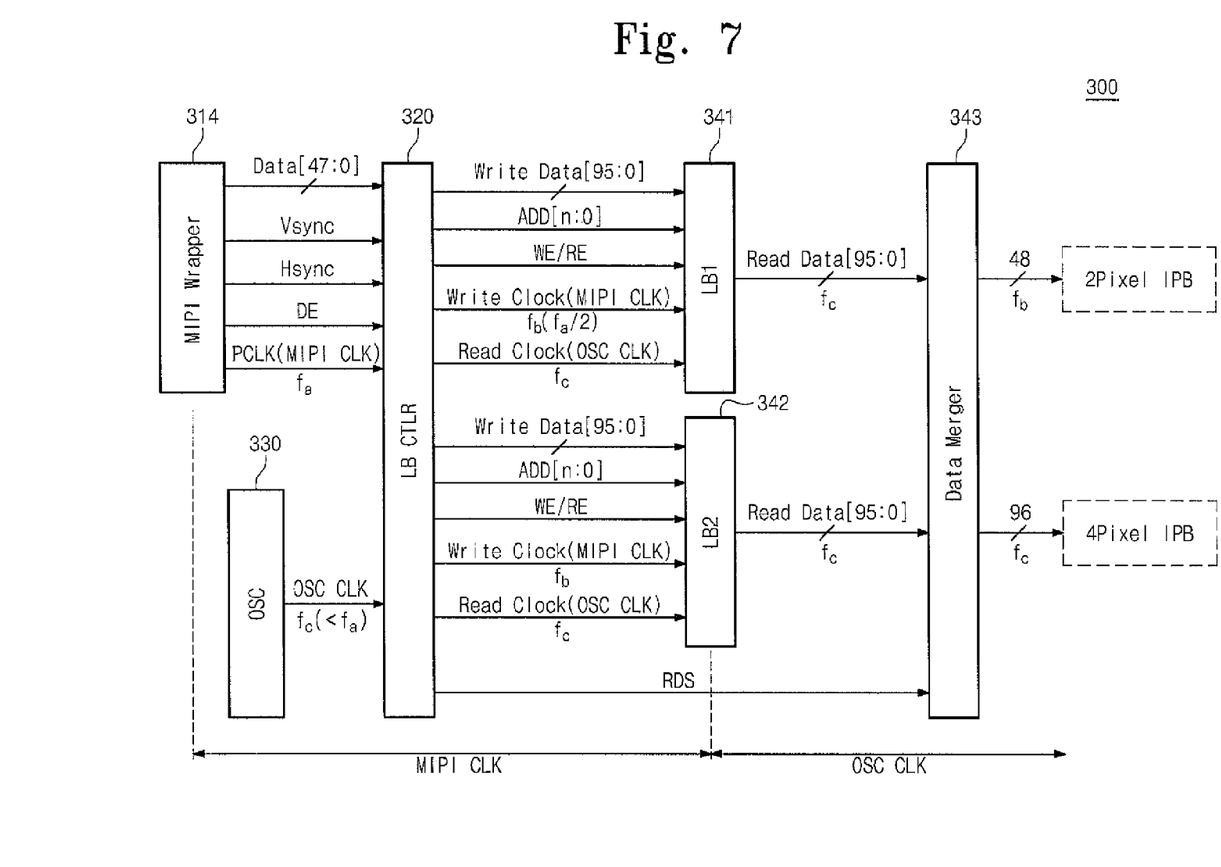
FIG. 7 is a block diagram illustrating a mobile DDI according to an exemplary embodiment of the inventive concept.

FIG. 7 is a block diagram illustrating a mobile DDI according to an exemplary embodiment of the inventive concept. Referring to FIG. 7, a mobile DDI 300 includes a MIPI wrapper 314, a line buffer controller 320, an oscillator 330, a first line buffer 341, a second line buffer 342, and a data merger 343.

The MIPI wrapper 314 may output 48-bit display data Data[47:0], a vertical synchronization signal Vsync, a horizontal synchronization signal Hsync, a data enable signal DE, a clock signal PCLK (or, MIPI CLK). In an exemplary embodiment, a frequency $f_a$ of an external clock signal MIPI CLK is 125 MHz.

The line buffer controller 320 may output 96-bit write data Write Data[95:0] corresponding to an odd/even lane, an address ADD[n:0], a write/read enable signal WE/RE, a write clock signal, and a read clock signal.

In an exemplary embodiment, the write clock signal is an external clock signal MIPI CLK, and the read clock signal is an internal clock signal OSC CLK. The write clock signal may have a frequency $f_b$ corresponding to half a frequency fa of the external clock signal MIPI CLK. The read clock signal may have a frequency $f_c$ of the internal clock OSC CLK.

The oscillator 330 generates the internal clock signal OSC CLK.

The first line buffer 341 may receive 96-bit write data Write Data[95:0] corresponding to an odd lane, an address ADD[n:0], a write/read enable signal WE/RE, a write clock signal, and a read clock signal output from the line buffer controller 320, store write data in synchronization with the write clock signal, and read data in synchronization with the read clock signal. The first line buffer 341 may output 96-bit read data Read Data[95:0] using a frequency $f_c$ of the internal clock signal OSC CLK.

The second line buffer 342 may receive 96-bit write data Write Data[95:0] corresponding to an even lane, an address ADD[n:0], a write/read enable signal WE/RE, a write clock signal, and a read clock signal output from the line buffer controller 320, store write data in synchronization with the write clock signal, and read data in synchronization with the read clock signal. The second line buffer 342 may output 96-bit read data Read Data[95:0] using a frequency $f_c$ of the internal clock signal OSC CLK.

The data merger 343 receives read data from the first and second line buffers 341 and 342, merges the input read data in response to a read data selection signal RDS, and outputs the merged display data. For example, based on the read data selection signal RDS, the data merger 343 may output 48-bit data using the frequency $f_b$ or 96-bit data using the frequency $f_c$. The 48-bit data may be processed by a 2-pixel based image processor, and the 96-bit data may be processed by a 4-pixel based image processor.

Figure 8:
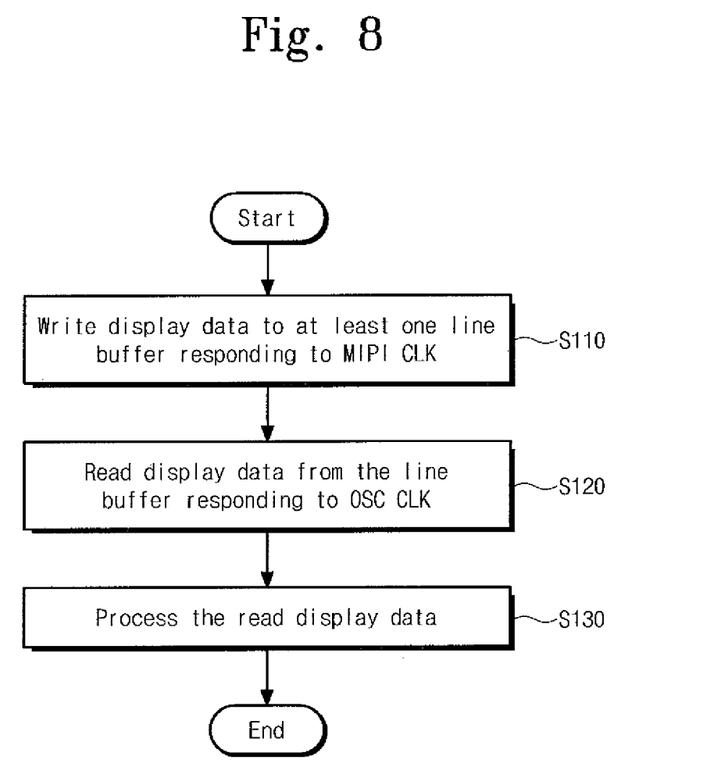
FIG. 8 is a flow chart illustrating a display data processing method according to an exemplary embodiment of the inventive concept.

FIG. 8 is a flow chart illustrating a display data processing method according to an exemplary embodiment of the inventive concept. Referring to FIG. 8, in operation S110, display data input from a host is stored in at least one line buffer in response to an external clock signal MIPI CLK. In operation S120, display data stored in the at least one line buffer is read in response to an internal clock signal OSC CLK. A frequency of the internal clock signal OSC CLK may be lower than that of the external clock signal MIPI CLK. In operation S130, an image data processing block processes the read display data.

Figure 9:
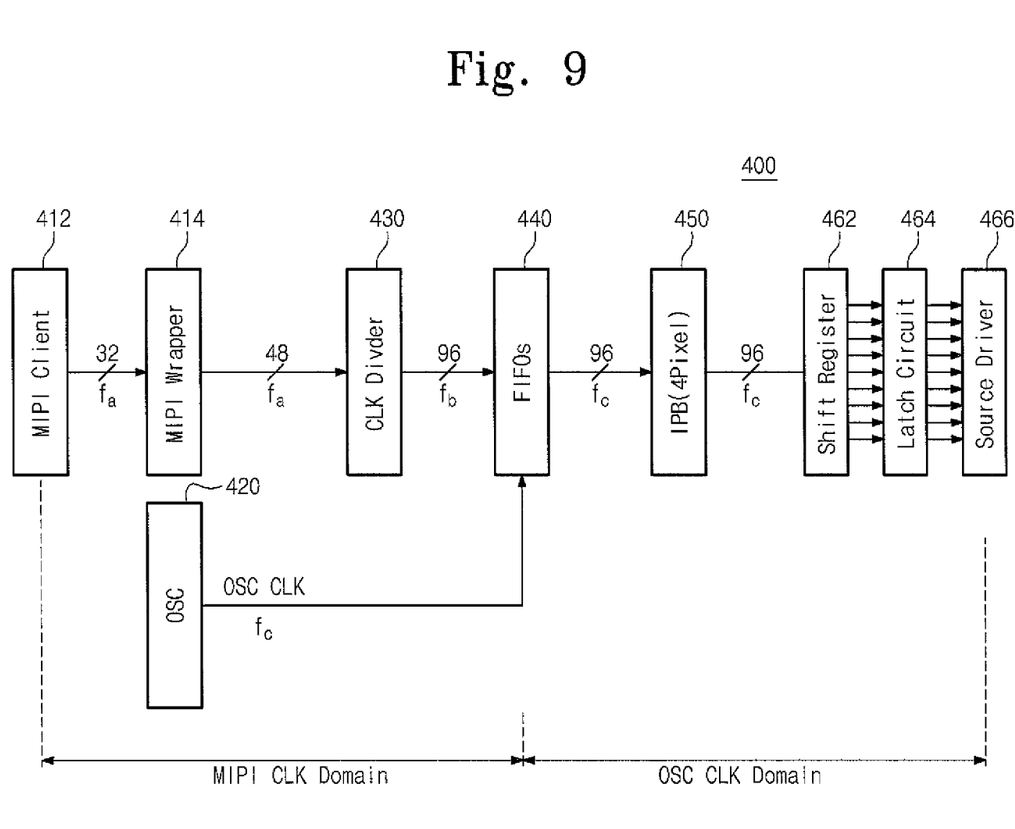
FIG. 9 is a block diagram illustrating a 4-pixel based DDI according to an exemplary embodiment of the inventive concept.

FIG. 9 is a block diagram illustrating a 4-pixel based DDI according to an exemplary embodiment of the inventive concept. Referring to FIG. 9, a DDI 400 includes a MIPI client 412, a MIPI wrapper 414, a clock divider 430, an oscillator 420, a first-in-first-out FIFO memory 440, an image data processing block 450, a shift register 462, a latch circuit 464, and a source driver 466.

A line buffer controller 120, first and second line buffers 141 and 142, a data merger 143 of a DDI 100 in FIG. 5 may be replaced with the clock divider 430 and the FIFO memory 440 of the DDI 400 in FIG. 9. In an exemplary embodiment of the inventive concept, the clock divider 430 is configured to receive an input of image data (e.g., from MIPI wrapper 414) in response to an external clock signal of frequency $f_a$ and output divided image data. The FIFO memory 440 receives the divided image data output by the clock divider 430 and outputs the divided image data to the image processing block 450 in response to an internal clock signal of frequency $f_c$. The frequency of the internal clock signal $f_c$ is lower than the frequency of the external clock external clock signal $f_a$. The oscillator 420 may generate the internal clock signal. As an example, the output of the FIFO memory 440 to the image processing block 450 is four pixel data or image data for four pixels. The image processing block 450 performs an operation on the four pixel data and provides a result of the operation to the shift register 462.

Figure 10:
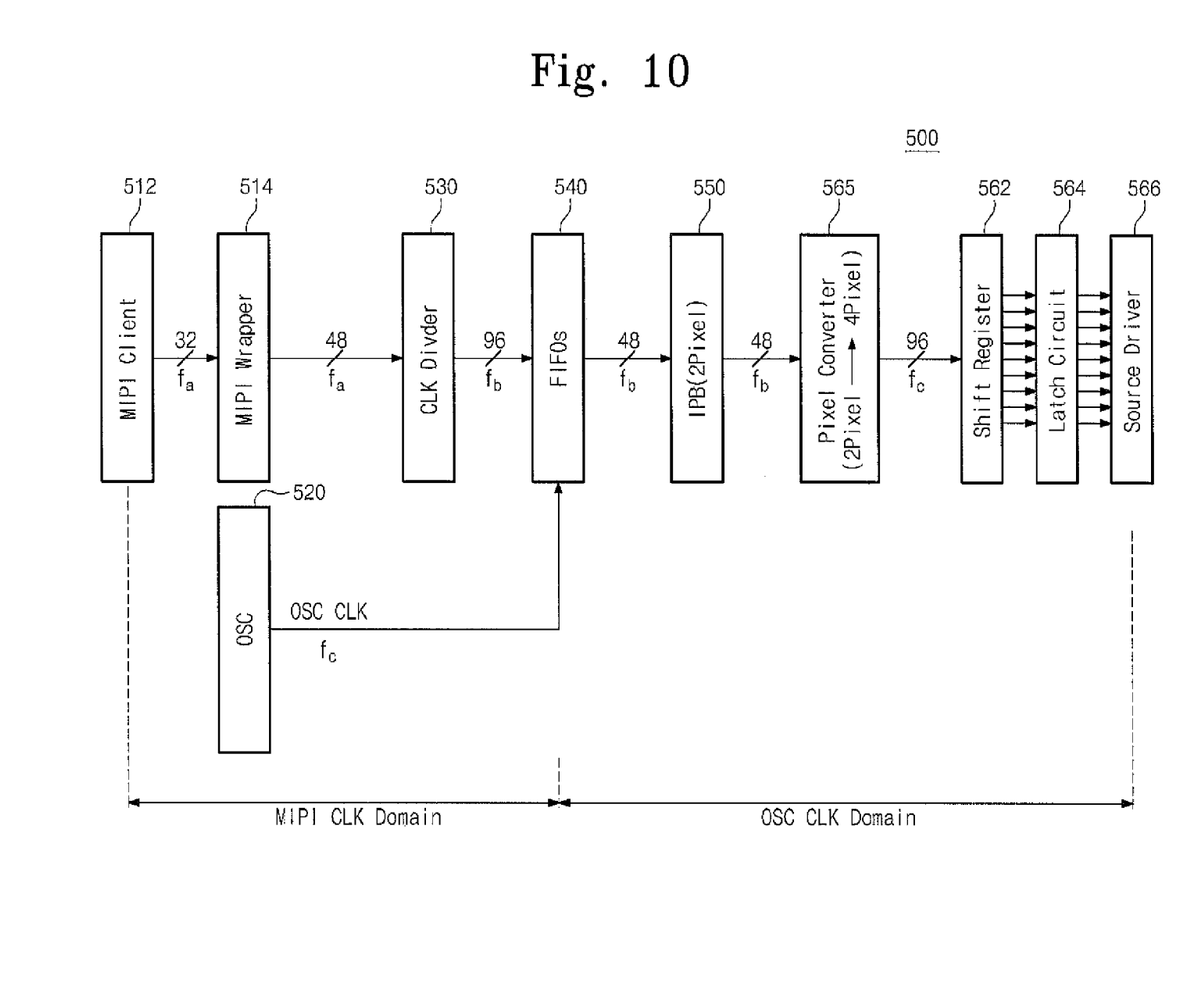
FIG. 10 is a block diagram illustrating a 4-pixel based DDI according to an exemplary embodiment of the inventive concept.

FIG. 10 is a block diagram illustrating a 4-pixel based DDI according to an exemplary embodiment of the inventive concept. Referring to FIG. 10, a DDI 500 includes a MIPI client 512, a MIPI wrapper 514, a clock divider 530, an oscillator 520, a FIFO memory 540, an image data processing block 550, a pixel converter 565, a shift register 562, a latch circuit 564, and a source driver 566. In an exemplary embodiment of the inventive concept, the clock divider 530 is configured to receive an input of image data (e.g., from MIPI wrapper 514) in response to an external clock signal of frequency $f_a$ and output divided image data. The FIFO memory 540 receives the divided image data output by the clock divider 530 and outputs the divided image data in response to an internal clock signal of frequency $f_c$. The frequency of the internal clock signal $f_c$ is lower than the frequency of the external clock external clock signal $f_a$. The oscillator 520 may generate the internal clock signal. As an example, the output of the FIFO memory 540 to the image processing block 550 is two pixel data or image data for two pixels. The image processing block 550 performs an operation on the two pixel data and provides a result of the operation to the pixel converter 565. The pixel converter 565 converts the two pixel data output by the image processing block 550 to four pixel data for output to the shift register 562.

A line buffer controller 230, first and second line buffers 241 and 242, and a data merger 243 of a DDI 200 in FIG. 6 may be replaced with the clock divider 530 and the FIFO memory 540 of the DDI 500 in FIG. 10.

Figure 11:
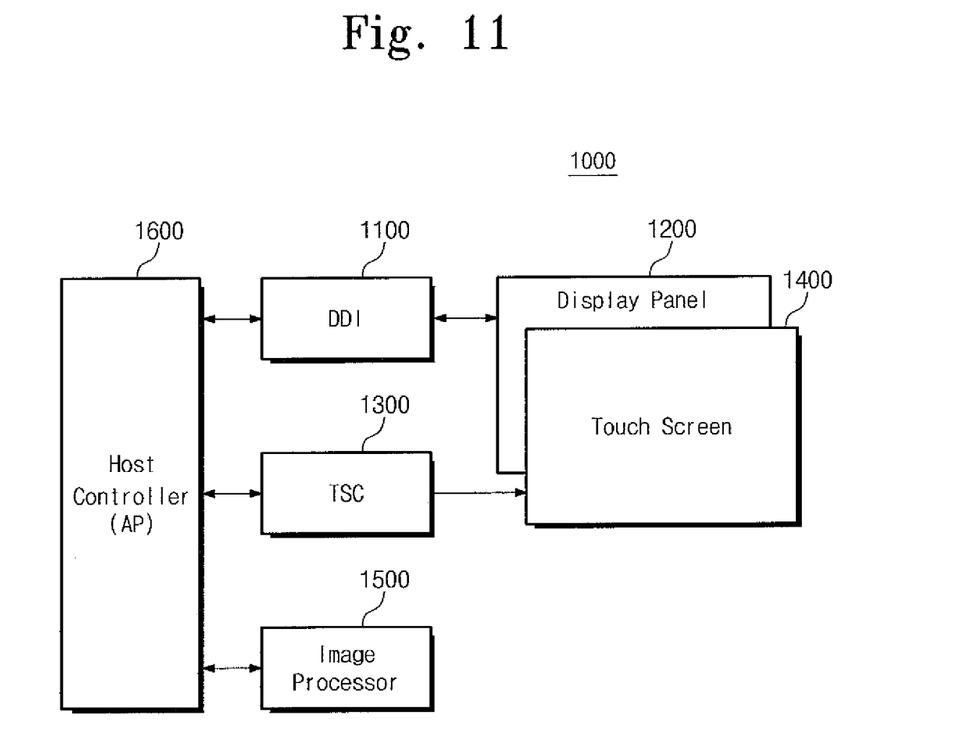
FIG. 11 is a block diagram illustrating a data processing system according to an exemplary embodiment of the inventive concept.

FIG. 11 is a block diagram illustrating a data processing system according to an exemplary embodiment of the inventive concept. Referring to FIG. 11, a data processing system 1000 includes a display driver integrated circuit 1100, a display panel 1200, a touch screen controller 1300, a touch screen 1400, an image processor 1500, and a host controller 1600.

In the data processing system 1000, the display driver integrated circuit 1100 may be configured to provide display data to the display panel 1200. The touch screen controller 1300 may be connected with the touch screen 1400 overlapped with the display panel 1200, and may be configured to receive sensing data from the touch screen 1400. The display driver integrated circuit 1100 may be configured to operate in a display data processing manner described with reference to FIGS. 1 to 11. The host controller 1600 may be an application processor or a graphics card.

In an exemplary embodiment, the data processing system 1000 is located within a mobile Smartphone (e.g., Galaxy S, i-Phone, etc.), a tablet personal computer PC (e.g., Galaxy tab, i-Pad, etc.), and the like.

In an exemplary embodiment of the inventive concept, the DDI is configured to provide image data of various resolutions such as a wide extended graphics array (WXGA) resolution and a Full I-ID-class ultra-high-definition display resolution.

While the inventive concept has been described with reference to exemplary embodiments thereof, various changes and modifications may be made without departing from the spirit and scope of the present invention.

What is claimed is:

1. A display driver integrated circuit comprising:
   a first line buffer configured to receive first pixel data of an odd lane as four pixel data in response to an external clock signal and output the first pixel data in response to an internal clock signal;
   a second line buffer configured to receive second pixel data as four pixel data of an even lane in response to the external clock signal and outputs the second pixel data in response to the internal clock signal;
   a line buffer controller configured to receive display data in units of two pixel data to output the first and second pixel data;
   a data merger configured to merge the first pixel data output from the first line buffer and second pixel data output from the second line buffer to generate merged pixel data of a size less than or equal to the four pixel data; and
   an image data processing block configured to process the merged pixel data,
   wherein a frequency of the internal clock signal is lower than a frequency of the external clock signal,
   wherein the two pixel data represents data for two pixels and the four pixel data represents data for four pixels.

2. The display driver integrated circuit of claim 1, wherein the line buffer controller controls a write operation and a read operation of the first and second line buffers and uses the external clock signal as a write clock for the write operation and the internal clock signal as a read clock for the read operation.

3. The display driver integrated circuit of claim 1, wherein the line buffer controller outputs a read data signal for merging the first pixel data output from the first line buffer and the second pixel data output from the second line buffer.

4. The display driver integrated circuit of claim 1, wherein the image data processing block processes the merged pixel data comprising four pixel data.

5. The display driver integrated circuit of claim 4, further comprising:

a shift register configured to shift display data, processed by the data image processing block, by the four pixel data in response to a clock signal;
a latch circuit configured to store the shifted display data; and
a source driver configured to generate an analog voltage corresponding to display data stored in the latch circuit.

6. The display driver integrated circuit of claim 1, wherein the image data processing block processes the merged pixel data comprising the two pixel data.

7. The display driver integrated circuit of claim 6, further comprising:
   a pixel converter configured to convert two-pixel display data processed by the image data processing block into four-pixel display data.

8. The display driver integrated circuit of claim 1, wherein the external clock signal and a data packet are received from an external device in an MIPI (mobile industry processor interface) format.

9. The display driver integrated circuit of claim 8, further comprising:
   a MIPI client configured to receive the data packet via a plurality of lanes; and
   a MIPI wrapper configured to receive 32-bit display data from the MIPI client in response to the external clock signal and output 48-bit display data as a unit of the two pixel data in response to the external clock signal.

10. The display driver integrated circuit of claim 9, wherein the plurality of lanes is 4 and a frequency of the external clock signal is below 125 MHz.

11. The display driver integrated circuit of claim 1, further comprising:
    an oscillator configured to generate the internal clock signal.

12. A display data processing method of a display driver integrated circuit, comprising:
    writing first display data comprising four pixel data to a first line buffer in response to an external clock signal;
    writing second display data comprising four pixel data to a second line buffer in response to an external clock signal;
    reading the first display data from the first line buffer in response to an internal clock signal;
    reading the second display data from the second line buffer in response to an internal clock signal;
    merging the read first and second display data to generate merged data of a size less than or equal to the four pixel data; and
    processing the merged data,
    wherein a frequency of the internal clock signal is lower than a frequency of the external clock signal, and
    wherein the four pixel data represents data for four pixels.

13. The display data processing method of claim 12, further comprising:
    receiving a data packet and the external clock signal from an external device; and
    outputting the display data from the input data packet to the first line buffer and the second line buffer.

14. A display driver integrated circuit comprising:
    a clock divider configured to receive an input of image data representing pixel data for a first number of pixels and output divided image data representing pixel data for a second number of pixels in response to an external clock signal;
    a first-in-first-out FIFO memory configured to receive the divided image data and output the divided image data in response to an internal clock signal;
    an image data processing block configured to process the divided image data output by the FIFO memory, wherein a frequency of the internal clock signal is lower than a frequency of the external clock signal, and wherein the second number is larger than the first number, wherein the divided image data input to the image data processing block is four pixel data representing image data for four pixels.

15. The display driver integrated circuit of claim 14, further comprising:

a shift register configured to shift display data output by the processing block by the four pixel data in response to a clock signal;

a latch circuit configured to store the shifted display data; and a source driver configured to generate an analog voltage corresponding to display data stored in the latch circuit.

16. The display driver integrated circuit of claim 14, wherein the divided image data input to the image data processing block is two pixel data representing image data for two pixels.

17. The display driver integrated circuit of claim 16, further comprising a pixel converter configured to convert two pixel data processed by the image data processing block into four pixel data.

18. The display driver integrated circuit of claim 14, wherein the input of image data is two pixel data representing image data for two pixels.

* * * * *